(12) United States Patent
Conorich et al.

(10) Patent No.: US 6,379,194 B1
(45) Date of Patent: Apr. 30, 2002

(54) WIRING BLOCK MOUNT

(75) Inventors: Theodore A. Conorich, Parsippany Township; Michael G. German, Secaucus; William J. Ivan, Woodbridge, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/572,751

(22) Filed: May 16, 2000

(51) Int. Cl.[7] ................................. H01R 9/22
(52) U.S. Cl. ....................................... 439/709
(58) Field of Search ................ 439/709, 711–718; 248/222.14; 174/50

(56) References Cited

U.S. PATENT DOCUMENTS

| | | | | |
|---|---|---|---|---|
| 4,265,502 A | * | 5/1981 | Blodee et al. | 312/109 |
| 5,324,206 A | * | 6/1994 | Conroy-Wass | 439/77 |
| 5,989,074 A | * | 11/1999 | Miller et al. | 439/709 |
| 6,086,415 A | * | 7/2000 | Sanchez et al. | 439/540.1 |
| 6,142,835 A | * | 11/2000 | Daoud | 439/709 |

* cited by examiner

*Primary Examiner*—Brian Sircus
*Assistant Examiner*—Michael C. Zarroli
(74) *Attorney, Agent, or Firm*—Gibbons Del Deo, Dolan, Griffinger & Vecchione (57) ABSTRACT

A wiring block mounting bracket for mounting a conductor termination array and wiring block on an industry standard 19 inch Terminal Frame System. For telecommunications and data management systems, the wiring block mount allows the mounting of one to four termination arrays only, without the need for a back panel.

13 Claims, 8 Drawing Sheets

WIRING BLOCK MOUNT

FIELD OF THE INVENTION

This invention relates generally to the field of telecommunications, and more particularly to a bracket for mounting a wiring block on a terminal frame.

BACKGROUND OF THE INVENTION

The telecommunications and data management industries utilize connective hardware for general building wiring, premises distribution systems, local area networks, and other network applications. The connective hardware is commonly mounted on an industry standard (EIA-310) terminal frame.

Figure 1:
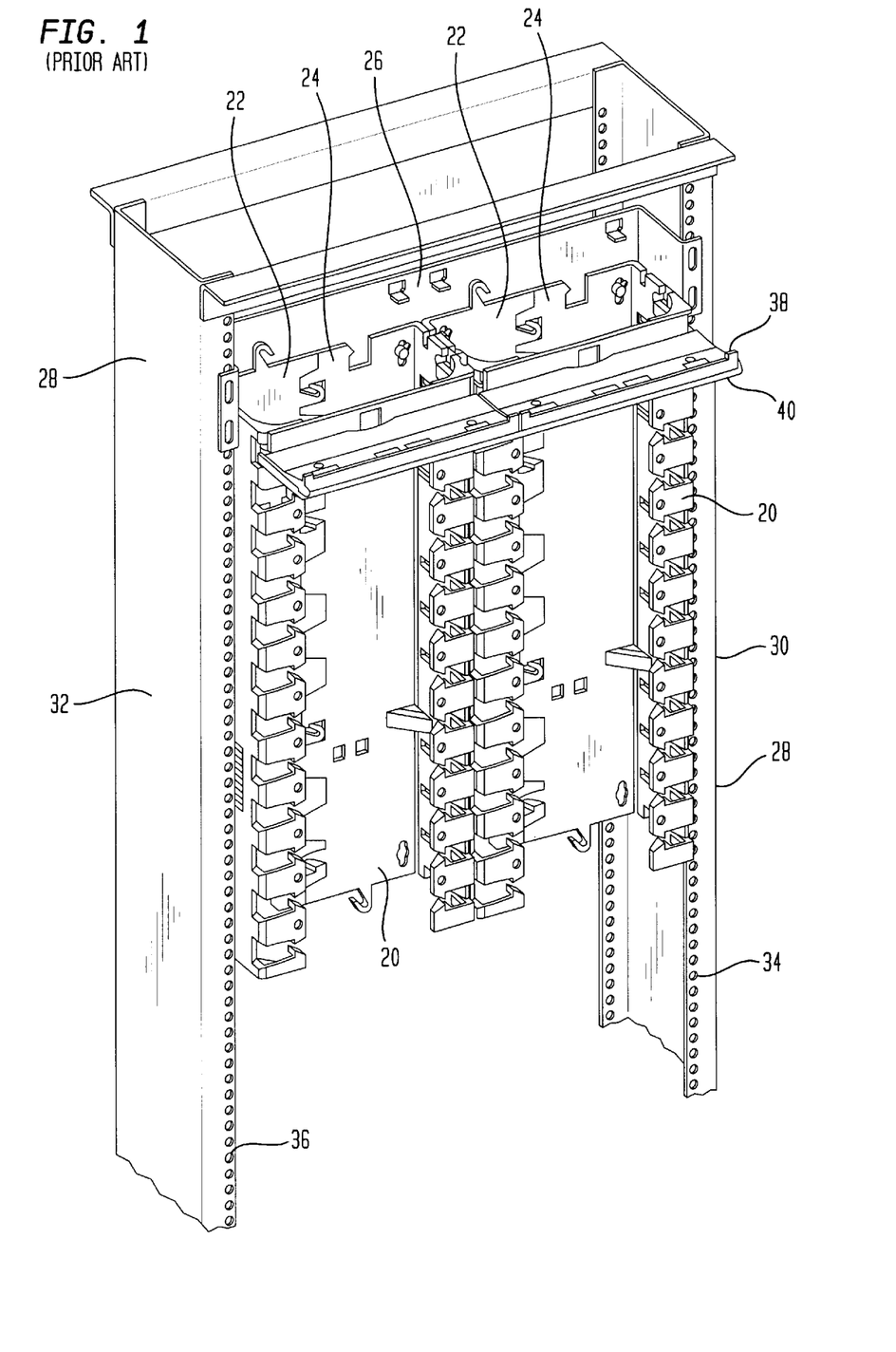
FIG. 1 is a perspective view of a prior art 19 inch Terminal Frame System with two wiring blocks installed on two back panels.

Referring now to FIG. 1, the prior art system for mounting one particular type of connective hardware is shown. A back panel 20 is assembled from left 22 and right 24 portions. Two back panels 20 are then connected together with a back panel bracket 26, and the assembly is installed on the frame 28. Two wiring blocks 38 are shown installed on the back panels 20. A conductor termination array 40 is mounted on each wiring block 38. The back panels 20 will each accommodate twelve wiring blocks 38. This system occupies about one-third of the frame 28 space, and provides positions for twenty-four wiring blocks 38, even if only one or two wiring blocks 38 are required. This large minimum capacity discourages use of the system by small entities.

Accordingly, there is a need to provide a wiring block mount that will efficiently accommodate one or two wiring blocks across one row or two rows only and will readily isolate separate circuits from one another.

SUMMARY OF THE INVENTION

In accordance with the present invention, there is provided a wiring block mount for use in connection with a conductor termination array having a predetermined length. The wiring block mount is also used in connection with a terminal frame having two parallel columns spaced apart a predetermined distance. Each column has a plurality of vertically in-line mounting holes spaced uniformly apart. The wiring block mount comprises a girder having mounting holes aligned with the column mounting holes for mounting of the girder to the column. Attachment means is provided for attaching the termination array to the girder.

BRIEF DESCRIPTION OF THE DRAWING

A more complete understanding of the present invention may be obtained from consideration of the following description in conjunction with the drawing, in which:

FIG. 11a is a rear perspective view of yet another wiring block mount constructed in accordance with the invention;

FIG. 11b is a front perspective of the wiring block mount shown in FIG. 11a.

DESCRIPTION OF THE PREFERRED EMBODIMENTS

Referring now to the drawing, and especially to FIGS. 2, 3, 4, 5, 6, and 7, a support base or wiring block mount 42 constructed in accordance with the invention is shown. The wiring block mount 42 is used in connection with a first conductor termination array 40 having a predetermined length. The first termination array 40 is secured to the first wiring block 38. The wiring block mount 42 is also used in connection with a terminal frame 28 having first 30 and second 32 parallel columns spaced apart a predetermined distance. Each column 30 and 32 has a plurality of vertically in-line mounting holes 34 and 36 respectively, spaced in a controlled pattern.

The wiring block mount 42 includes a girder 44 extending between opposite first 46 and second 48 ends. The girder first end 46 has at least one mounting hole 50 aligned with one of the first column mounting holes 34. The girder second end 48 has at least one mounting hole 52 aligned with one of the second column mounting holes 36. Fasteners such as bolts (not shown) would then be used to mount the girder 44 to the columns 30 and 32. The girder 44 has a front 54 and a rear 56. The girder 44 includes a web 58 extending between upper 60 and lower 62 flanges, which extend rearward from the girder web 58. Attachment means is provided for attaching the termination array 40 to the front 54 of the girder 44. Specifically, the attachment means comprises a cable organizer type first wiring block 38 secured to the wiring block mount 42. The first wiring block 38 has first 64 and second 66 stabilizing arms projecting outward from the first wiring block 38. Also projecting outward are the first 68 and second 70 mounting latches.

The wiring block mount 42 further comprises first 72 and second 74 support members, each having a hole 76 and 78 respectively, there through. The support members 72 and 74 extend rearward from one of the girder flanges. The wiring block mount 42 includes first 80 and second 82 strike plates having first 84 and second 86 strike barbs respectively. The strike plates 80 and 82 extend rearward from the girder web 58, which includes holes 88 juxtaposed with the strike plates and support members. Thus, upon securing the first wiring block 38 to the wiring block mount 42, the stabilizing arms 64 and 66 and the mounting latches 68 and 70 will pass through the girder web holes. The first 64 and second 66 stabilizing arms will slidingly engage the first 76 and second 78 support member holes respectively, so as to stabilize the wiring block. Then, the first 68 and second 70 mounting latches will engage the first 84 and second 86 strike barbs respectively, so as to releasably retain the first wiring block 38 on the wiring block mount 42.

The wiring block mount 42 can accommodate a second conductor termination array 90 having a predetermined length. A second wiring block 92 is secured to the wiring block mount 42 alongside the first wiring block 38. The second wiring block 92 has third 94 and fourth 96 stabilizing arms and third 98 and fourth 100 mounting latches projecting outward from the second wiring block 92. The second termination array 90 is secured to the second wiring block 92.

The wiring block mount 42 further comprises third 102 and fourth 104 support members, each having a hole 106 and 108 respectively, there through. Third 110 and fourth 112 strike plates are provided, having third 114 and fourth 116 strike barbs respectively. Thus, upon securing the second wiring block 92 to the wiring block mount 42, the third 94 and fourth 96 stabilizing arms will slidingly engage the third 106 and fourth 108 support member holes respectively, so as to stabilize the second wiring block. Then the third 98 and fourth 100 mounting latches will engage the third 114 and fourth 116 strike barbs respectively, so as to releasably retain the second wiring block 92 on the wiring block mount 42.

Figures 8, 9:
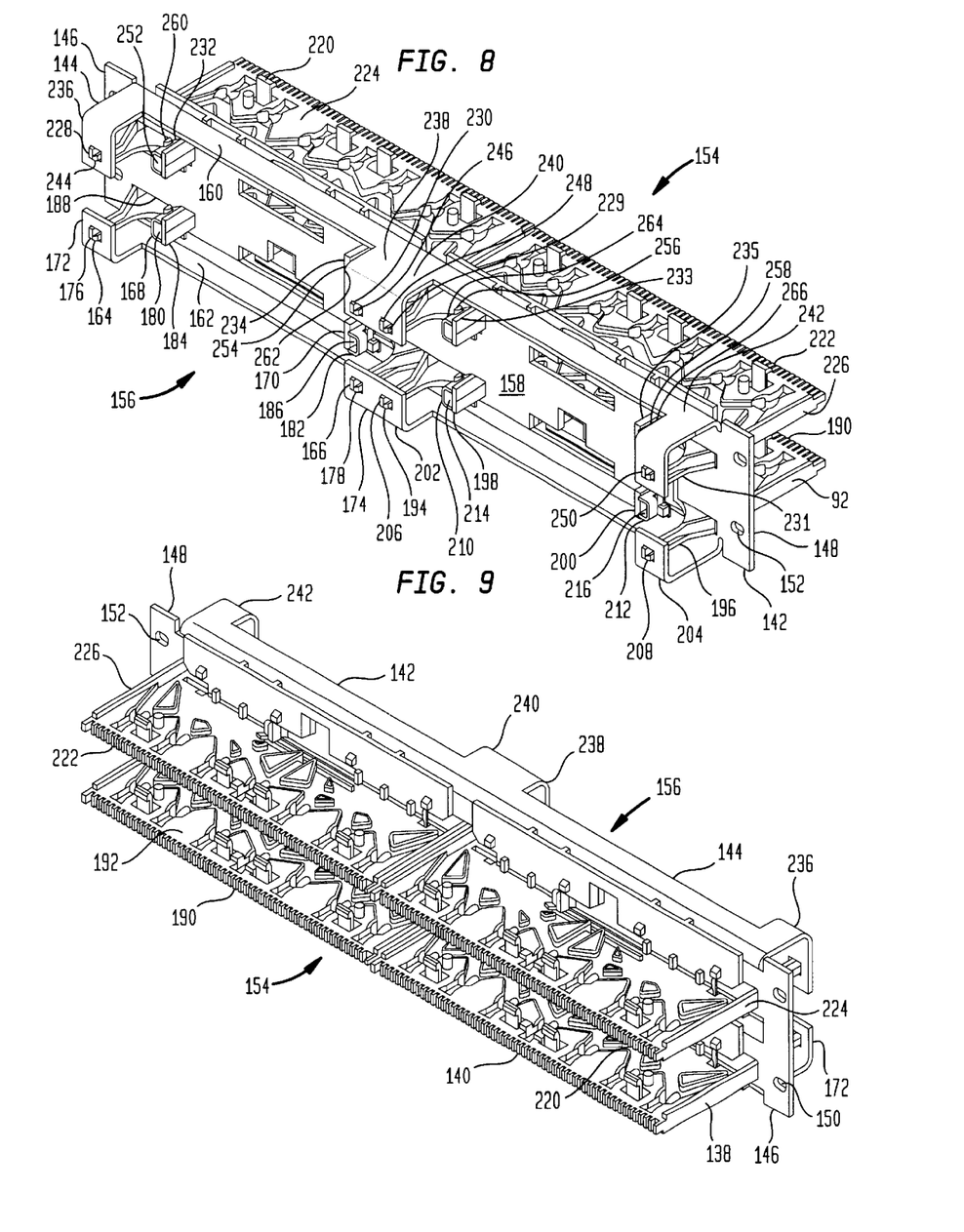
FIG. 8 is a rear perspective view of another wiring block mount constructed in accordance with the invention, along with four cable organizer type wiring blocks.
FIG. 9 is a front perspective view of the wiring block mount of FIG. 8, along with four cable organizer type wiring blocks.

Referring now to FIGS. 8 and 9, as well as to FIGS. 2, 3, 4, 5, 6, and 7, another wiring block mount constructed in accordance with the invention is shown at 142. Wiring block mount 142 is similar to the above-described wiring block mount 42 in that it includes a girder 144 extending between opposite first 146 and second 148 ends. The girder first end 146 has at least one mounting hole 150 aligned with one of the first column mounting holes 34. The girder second end 148 has at least one mounting hole 152 aligned with one of the second column mounting holes 36. Fasteners such as bolts (not shown) would then be used to mount the girder 144 to the columns 30 and 32. The girder 144 has a front 154 and a rear 156. The girder 144 includes a web 158 extending between upper 160 and lower 162 flanges, which extend rearward from the girder web 158. Attachment means is provided for attaching a first termination array 140 to the front 154 of the girder 144. Specifically, the attachment means comprises a cable organizer type first wiring block 138 secured to the wiring block mount 142. The first wiring block 138 has first 164 and second 166 stabilizing arms projecting outward from the first wiring block 138. Also projecting outward are first 168 and second 170 mounting latches. The first termination array 140 is secured to the first wiring block 138.

The wiring block mount 142 further comprises first 172 and second 174 support members, each having a hole 176 and 178 respectively, there through. The support members 172 and 174 extend rearward from one of the girder flanges. The wiring block mount 142 includes first 180 and second 182 strike plates having first 184 and second 186 strike barbs respectively. The strike plates 180 and 182 extend rearward from the girder web 158, which includes holes 188 juxtaposed with the strike plates and support members. Thus, upon securing the first wiring block 138 to the wiring block mount 142, the stabilizing arms 164 and 166 and the mounting latches 168 and 170 will pass through the girder web holes 188. The first 164 and second 166 stabilizing arms will slidingly engage the first 176 and second 178 support member holes respectively, so as to stabilize the wiring block. Then, the first 168 and second 170 mounting latches will engage the first 184 and second 186 strike barbs respectively, so as to releasably retain the first wiring block 138 on the wiring block mount 142.

The wiring block mount 142 can accommodate a second conductor termination array 190 having a predetermined length. A second wiring block 192 is secured to the wiring block mount 142 alongside the first wiring block 138. The second wiring block 192 has third 194 and fourth 196 stabilizing arms and third 198 and fourth 200 mounting latches projecting outward from the second wiring block 192. The second termination array 190 is secured to the second wiring block 192.

The wiring block mount 142 further comprises third 202 and fourth 204 support members, each having a hole 206 and 208 respectively, there through. Third 210 and fourth 212 strike plates are provided, having third 214 and fourth 216 strike barbs respectively. Thus, upon securing the second wiring block 192 to the wiring block mount 142, the third 194 and fourth 196 stabilizing arms will slidingly engage the third 206 and fourth 208 support member holes respectively, so as to stabilize the second wiring block. Then the third 198 and fourth 200 mounting latches will engage the third 214 and fourth 216 strike barbs respectively, so as to releasably retain the second wiring block 192 on the wiring block mount 142.

Wiring block mount 142 differs from the above-described wiring block mount 42 in that it is for use in connection with a third 220 and a fourth 222 conductor termination array, each array having a predetermined length. Third 224 and fourth 226 wiring blocks are secured to the wiring block mount 142 above the first 138 and second 192 wiring blocks. The third wiring block 224 has fifth 228 and sixth 230 stabilizing arms and fifth 232 and sixth 234 mounting latches projecting outward from the third wiring block 224. The fourth wiring block 226 has seventh 229 and eighth 231 stabilizing arms and seventh 233 and eighth 235 mounting latches projecting outward from the fourth wiring block 226. The third 220 and fourth 222 termination arrays are secured to the third 224 and fourth 226 wiring blocks, respectively.

The wiring block mount 142 further comprises fifth 236, sixth 238, seventh 240, and eighth 242 support members, each having a hole 244, 246, 248, and 250 respectively, there through. The wiring block mount 142 has fifth 252, sixth 254, seventh 256, and eighth 258 strike plates having fifth 260, sixth 262, seventh 264, and eighth 266 strike barbs respectively.

Upon securing the third 224 and fourth 226 wiring blocks to the wiring block mount 142, the fifth 228, sixth 230, seventh 229, and eighth 231 stabilizing arms will slidingly engage the fifth 244, sixth 246, seventh 248, and eighth 250 support member holes respectively. The third 224 and fourth 226 wiring blocks, and the fifth 232, sixth 234, seventh 233, and eighth 235 mounting latches, engage the fifth 260, sixth 262, seventh 264, and eighth 266 strike barbs respectively, so as to releasably retain the third 224 and fourth 226 wiring blocks on the wiring block mount 142.

Figure 2:
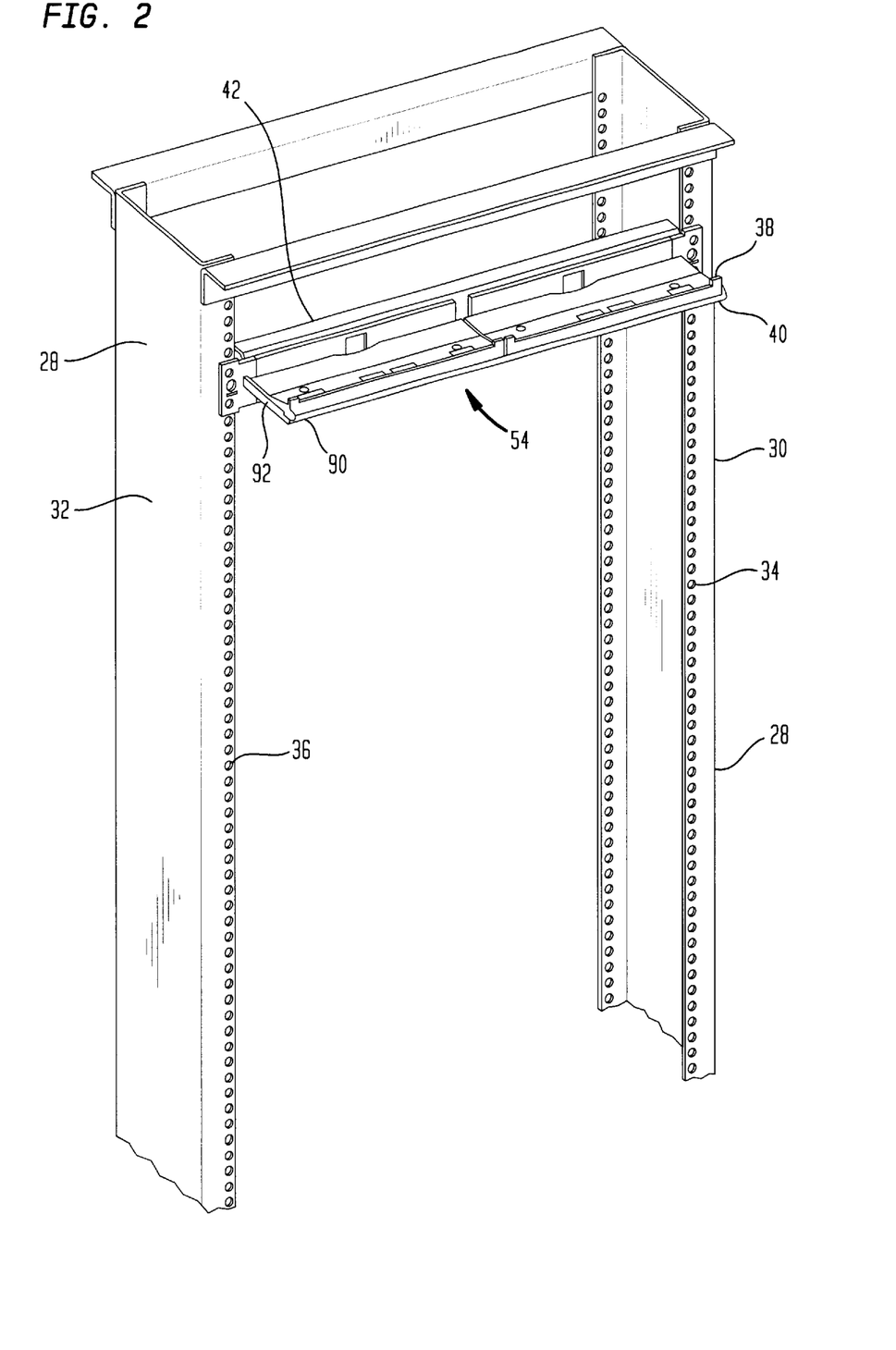
FIG. 2 is a perspective view of a wiring block mount constructed in accordance with the invention and mounted on an 19 inch Terminal Frame System with two wiring blocks.
Figure 3:
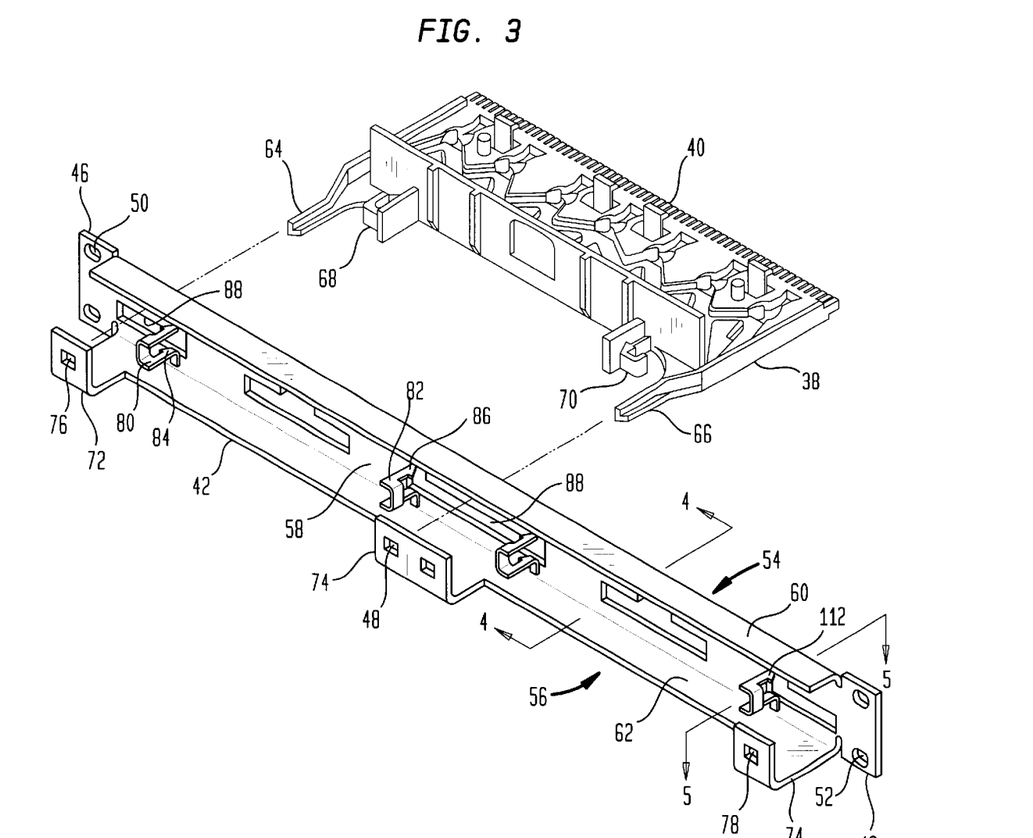
FIG. 3 is a perspective view of a wiring block mount constructed in accordance with the invention in a partially exploded assembly along with a cable organizer type wiring block.
Figure 4:
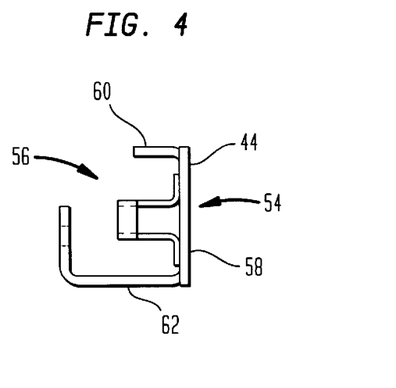
FIG. 4 is a side elevational cross-sectional view of the wiring block mount of FIG. 3, taken along lines 4—4 of FIG. 3.
Figure 5:
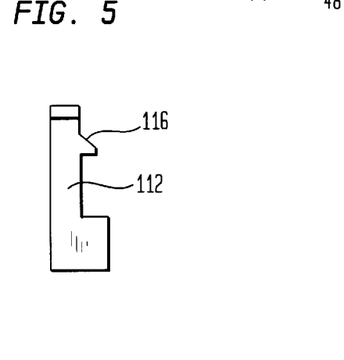
FIG. 5 is a top plan cross-sectional view of the retaining detail of the wiring block mount of FIG. 3, taken along lines 5—5 of FIG. 3.
Figures 6, 7:
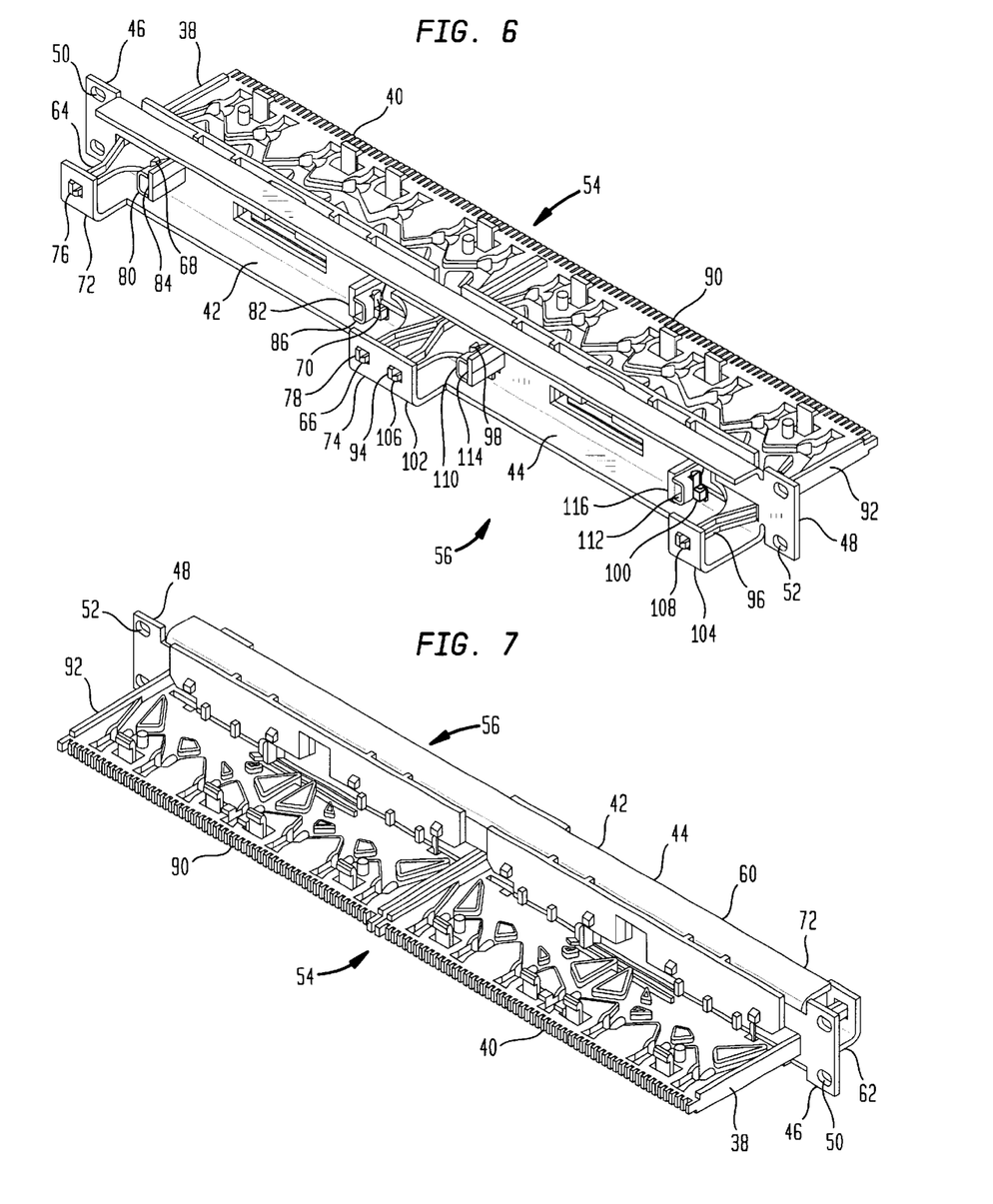
FIG. 6 is a rear perspective view of the wiring block mount of FIG. 3, along with two cable organizer type wiring blocks.
FIG. 7 is a front perspective view of the wiring block mount of FIG. 3, along with two cable organizer type wiring blocks.
Figure 10:
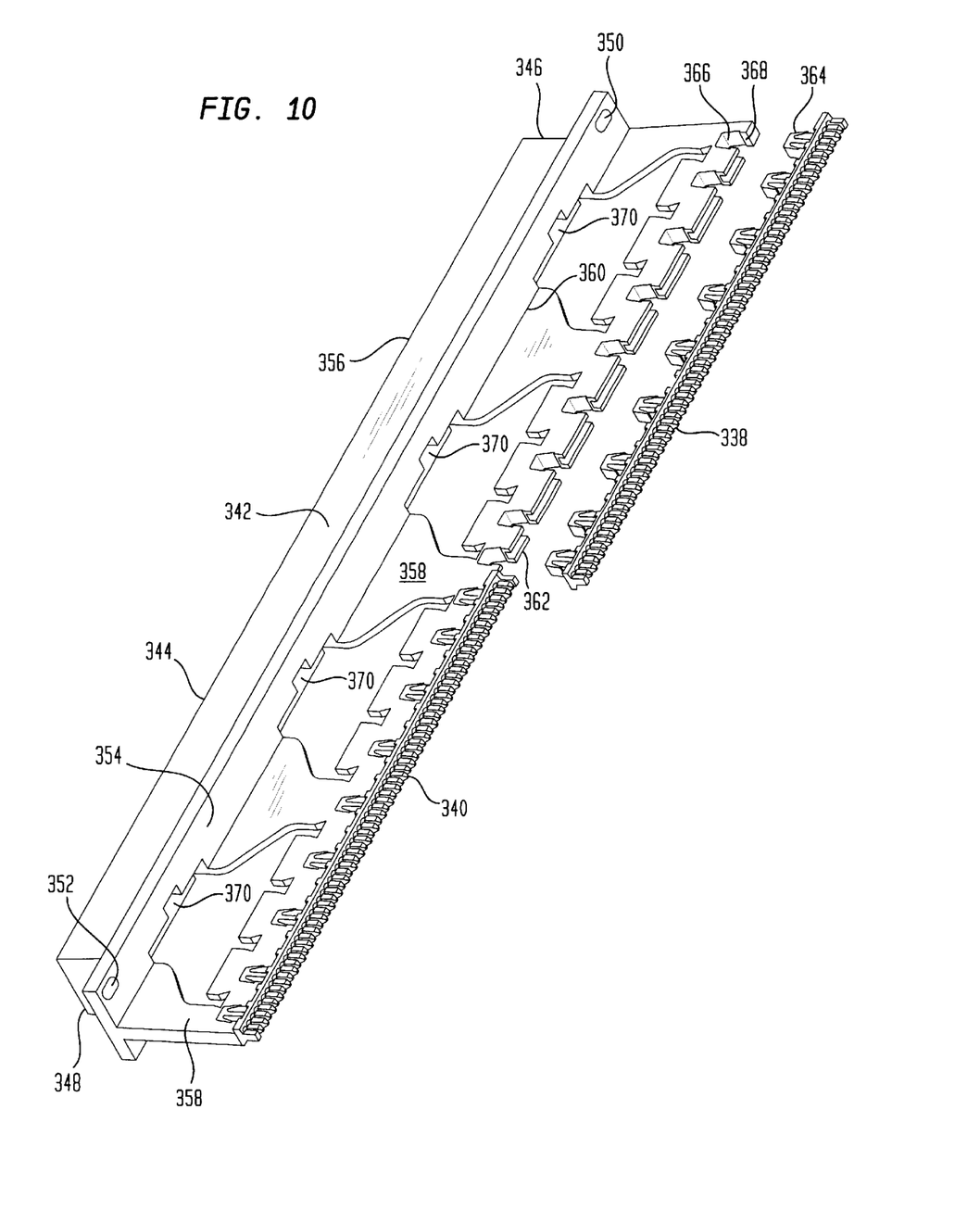
FIG. 10 is a front perspective view of another wiring block mount constructed in accordance with the invention.

Referring now to FIG. 10, as well as to FIG. 2, yet another wiring block mount constructed in accordance with the invention is shown at 342. The wiring block mount 342 is used in connection with first 338 and second 340 conductor termination arrays, each having a predetermined length. The wiring block mount 342 is also used in connection with the terminal frame 28, as described above. The wiring block mount 342 includes a girder 344 extending between opposite first 346 and second 348 ends. The girder first end 346 has at least one mounting hole 350 aligned with one of the first column mounting holes 34. The girder second end 348 has at least one mounting hole 352 aligned with one of the second column mounting holes 36. Fasteners such as bolts (not shown) would then be used to mount the girder 344 to the columns 30 and 32. The girder 344 has a front 354 and a rear 356. A standoff element 358 extends from an inner edge 360 integral with the front 354 of the girder 344 to an outer edge 362 generally parallel to the girder 344, and extending between the girder first 346 and second 348 ends. A plurality of securing barbs 364 are spaced apart along the length of the termination arrays 338 and 340. A plurality of recesses 366 are spaced apart along the standoff element outer edge 362 for receiving the barbs 364, the recesses 366 having shoulders 368 for releasably retaining the securing barbs 364. Holes 370 are passageways for routing cables through the wiring block to their termination points on the conductor termination arrays 338 and 340.

The present invention enables an increase in the circuit density, i.e. provide for more 4-pair connecting blocks per linear inch of wiring block. One embodiment providing increased circuit density can be seen by referring to FIGS. 6 and 7. Each assembled wiring block 38 and/or 92 holds seven 1.200 inch long 110 connecting blocks. Thus, each row on a 19 inch terminal frame, i.e. two wiring blocks side-by-side, accommodates up to fourteen 1.200 inch long 110 connecting blocks. However, referring now to FIG. 10, the wiring block assembly/molded bracket spans the entire row (width) of the 19 inch terminal frame and thus accommodates sixteen 1.200 inch long 110 connecting blocks. The increased density is accomplished by having standoff 358 taper outward slightly from that of the industry standard (EIA-310) of 19 inch long wiring block mount at edge 360 to a width greater than 19 inches (such as 19.5 inches) at the outer surface 362. The additional width provides sufficient space to support sixteen 1.200 inch long 110 connecting blocks in the same area of terminal frame, which previously only supported fourteen 1.200 inch long 110 connecting blocks.

Figures 11A, 11B:
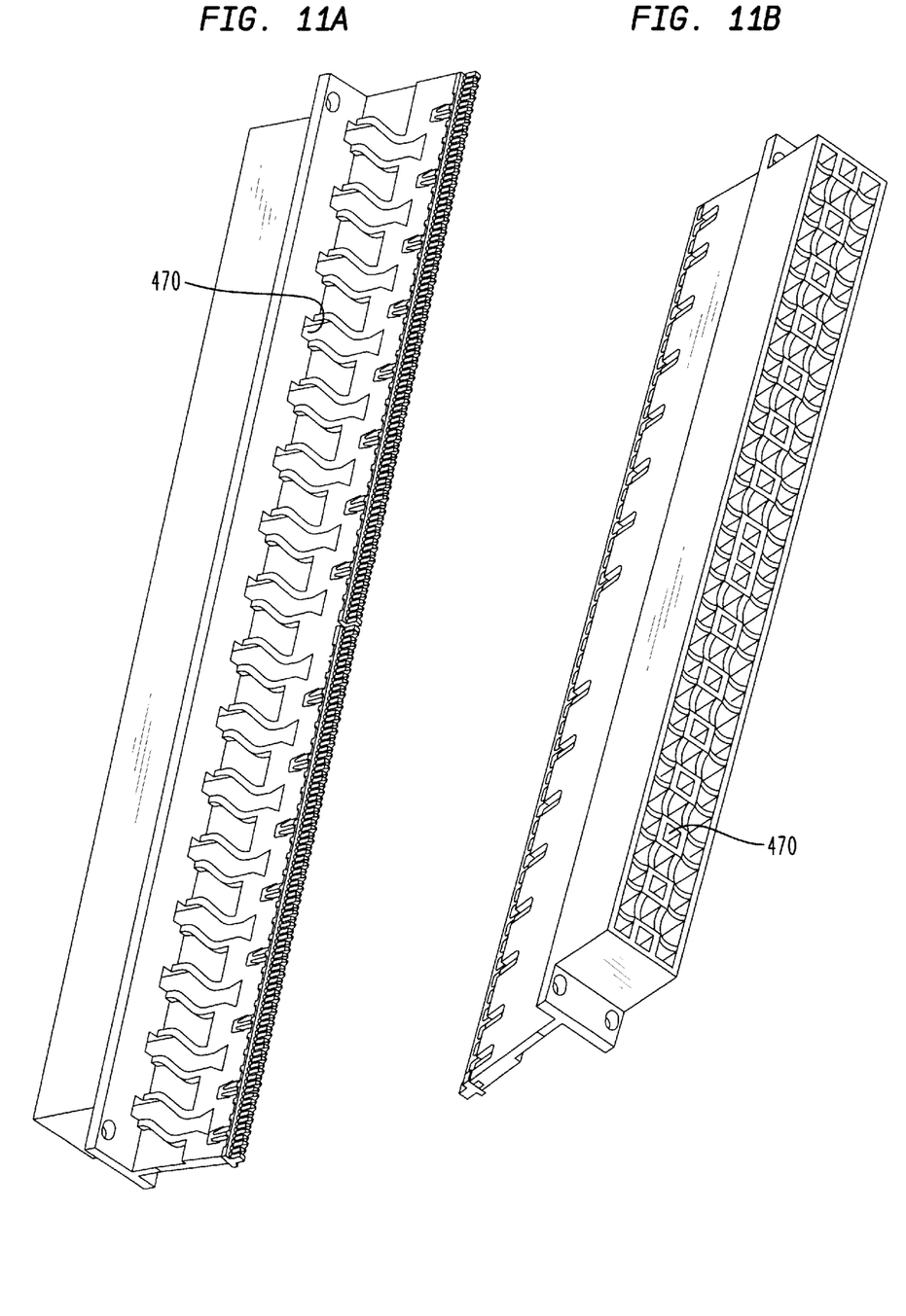
Figure 12A:
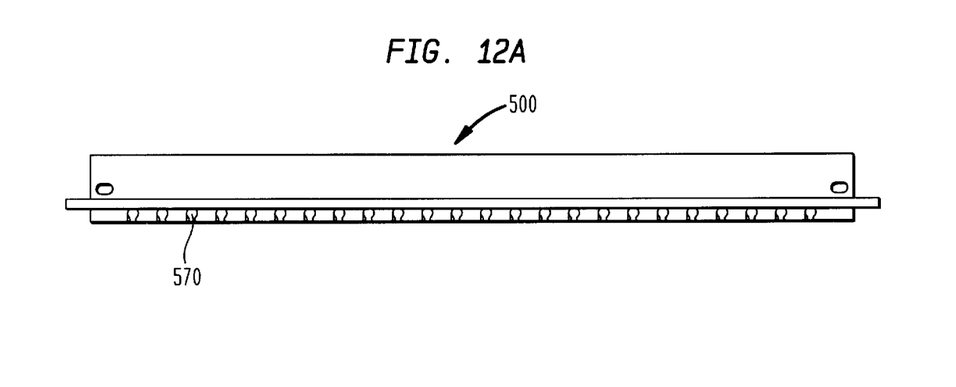
FIGS. 12a, 12b, 12c and 12d is yet another further wiring block mount constructed in accordance with the invention.
Figure 12B:
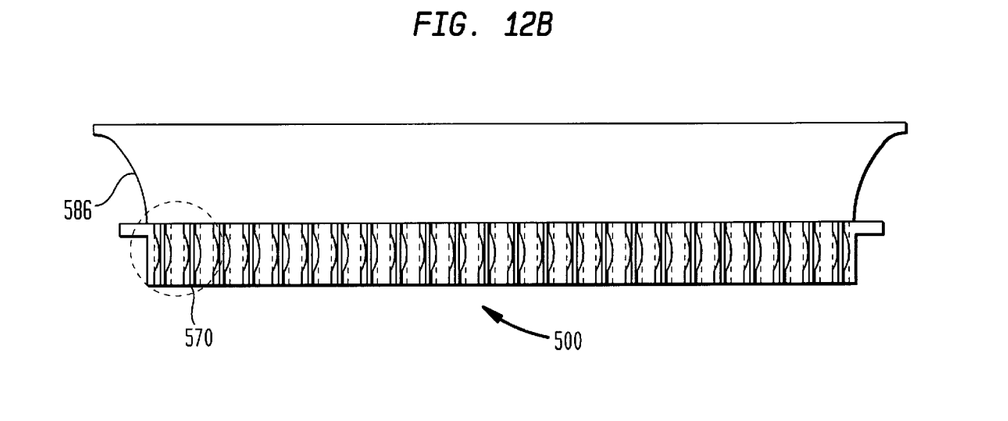
Figure 12C:
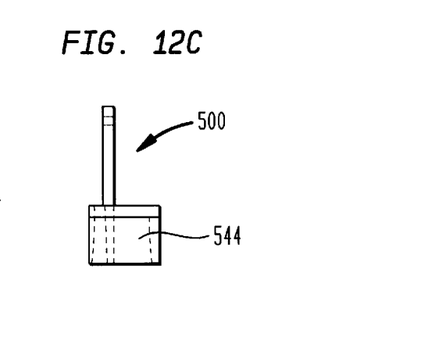
Figure 12D:
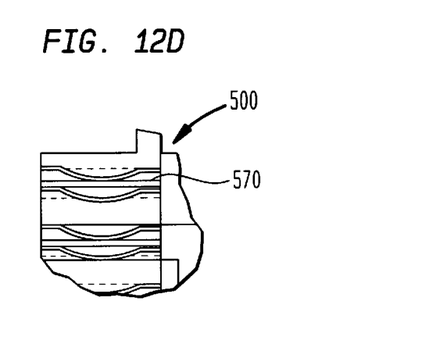

FIGS. 11*a* and 11*b* are a rear perspective view and a front perspective view of yet another wiring block mount constructed in accordance with the invention. FIGS. 12*a* and 12*b* are a top perspective view and a front perspective view of yet a further wiring block mount constructed in accordance with the invention. Referring now to FIGS. 10, 11*a*, 11*b*, 12*a*, 12*b*, 12*c* and 12*d* it can be seen that holes 370 are passageways for routing cables through the wiring block to their termination points on the conductor termination arrays 338 and 340. The passage ways can be individual holes 470 for each individual cable. Alternately, the passage ways can be slots 570 on the side of the girder 544 as seen in FIGS. 12*a*, 12*b*, 12*c*, and 12*d*. The "S" shaped slots 570 retain the cables once they have been inserted. Slots are often preferred over holes, as they permit the cables to be laid into place rather than having to be threaded through holes 370 or individual holes 470. Additionally, for cable management, it is desirable to have access to the building cables individually rather than a bundle of cables. Individual cable passage ways (individual holes 470 and "S" shaped slots 570) can be easily and clearly labeled on the surface of the girder.

In another embodiment of the present invention, utilizing a "double offset" connecting block a dramatic increase in circuit density can be implemented. The wiring block 500 shown in FIGS. 12*a*, 12*b*, 12*c* and 12*d* can hold up to twenty four of the double offset connecting blocks in the same area of terminal frame, which previously only supported fourteen 1.200 inch long 110 connecting blocks. Similar to the previous embodiment, in order to achieve this density increase, ends 580 of standoff 558 are flared out. The industry standard EIA-310 controls the X and Y planer dimensions of the 19 inch terminal frame. The present invention retains the spirit of this standard while exploiting the Z dimension (the dimension perpendicular to the X-Y plane) which is not controlled by the standard.

Referring now to FIGS. 2, 3, 4, and 5, a method is disclosed of mounting the conductor termination array 40 on the terminal frame 28. The method comprises the steps of: extending a girder 44 between opposite first 46 and second 48 ends to form a wiring block mount 42; aligning a mounting hole 50 at the girder first end 46 with one of the first column mounting holes 34; aligning a mounting hole 52 at the girder second end 48 with one of the second column mounting holes 36; mounting the girder 44 to the terminal frame 28; and attaching the termination array 40 to the front of the girder 44.

Further steps comprise: securing a wiring block 38 to the wiring block mount 42; and securing the termination array 40 to the wiring block 38; providing the wiring block mount 42 with a support member 72 having a hole 76 there through; sliding a wiring block stabilizing arm 64 into engagement with the support member hole 76 so as to stabilize the wiring block 38; providing the wiring block mount 42 with a strike plate 80 having a strike barb 84; and engaging a wiring block mounting latch 68 with the strike barb 84 so as to releasably retain the wiring block 38 on the wiring block mount 42.

Referring now to FIGS. 2 and 10, another method is disclosed of mounting a conductor termination array 338 on the terminal frame 28. The method comprises the steps of: extending a girder 344 between opposite first 346 and second 348 ends to form a wiring block mount 342; aligning a mounting hole 350 at the girder first end 346 with one of the first column mounting holes 34; aligning a mounting hole 352 at the girder second end 348 with one of the second column mounting holes 36; mounting the girder 344 to the terminal frame 28; and attaching the termination arrays 338 and 340 to the front 354 of the girder 344.

Further steps include: extending a standoff element 358 from an inner edge 360 integral with the girder 344 to an outer edge 362 generally parallel to the girder 344; and securing the termination arrays 338 and 340 to the standoff element outer edge 362; providing a plurality of securing elements, specifically securing barbs 364, spaced apart along the length of the termination arrays 338 and 340; providing a plurality of recesses 366 spaced apart along the standoff element outer edge 362; and retaining the securing elements 364 releasably in the recesses 366, by way of shoulders 368 into which the barbs 364 lock biasingly.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which will come within the scope of the appended claims, is reserved.

What is claimed:

1. A wiring block mount, for use in connection with a conductor termination array having a predetermined length, and a terminal frame having two parallel columns spaced apart a predetermined distance, each column having a plurality of vertically in-line mounting holes, the wiring block mount comprising:

a girder having mounting holes aligned with the column mounting holes for mounting of the girder to the columns;

attachment means for attaching the termination array to the girder; said attachment means comprising a wiring block secured to the wiring block mount, the termination array being secured to the wiring block, and wherein the wiring block further comprises at least one stabilizing arm and at least one mounting latch projecting outward from the wiring block; and the wiring block mount further comprises at least one support member having a hole therethrough to receive the at least one stabilizing arm so as to stabilize the wiring block, and at least one latch receiver, so that upon securing the wiring block to the wiring block mount, the at least one mounting latch will engage the at least one latch receiver so as to releasably retain the wiring block on the wiring block mount.

2. The wiring block mount as recited in claim 1, wherein the attachment means comprises:

a standoff element extending from an inner edge interval with the girder to an outer edge generally parallel to the girder, and securing means for securing the termination array to the standoff element outer edge.

3. The wiring block mount as recited in claim 2, wherein the securing means comprises:

a plurality of securing elements spaced apart along the length of the termination array; and a plurality of recesses spaced apart along the standoff element outer edge for releasably retaining the securing elements.

4. The wiring block mount as recited in claim 1 wherein said at least one latching means comprises at least one strike plate having a strike barb wherein the at least one mounting latch will engage the strike barb to releasably retain the wiring block on the wiring block mount.

5. A wiring block mount, for use in connection with a first conductor termination array having a predetermined length, and a terminal frame having first and second parallel columns spaced apart a predetermined distance, each column having a plurality of vertically in-line mounting holes spaced in a controlled pattern, the wiring block mount comprising:

a girder extending between opposite first an second ends, the girder first end having at least one mounting hole aligned with one of the first column mounting holes, the girder second end having at least one mounting hole aligned with one of the second column mounting holes for mounting of the girder to the columns, the girder having a front and a rear;

attachment means for attaching the termination array to the front of the girder; wherein:

the girder includes a web extending between upper an lower flanges;

the attachment means comprises a first wiring block secured to the wiring block mount, the first wiring block having first and second stabilizing arms and first and second mounting latches projecting outward from the first wiring block, the first termination array being secured to the first wiring block the wiring block further comprises first and second support members, each having a hole there through, and first and second strike plates having first and second strike barbs respectively, so that upon securing the first wiring block to the wiring block mount, the first and second stabilizing arms will slidingly engage the first and second support member holes respectively, so as to stabilize the wiring block, and the first and second mounting latches will engage the first and second strike barbs respectively, so as to releasable retain the first wiring block on the wiring block mount.

6. The wiring block mount as recited in claim 5, wherein:

the girder flanges extend rearward from the girder web;

the support members extend rearward from one of the girder flanges;

the strike plates extend rearward from the girder web; and the girder web includes holes juxtaposed with the strike plates and support members, so that upon securing the wiring block to the wiring block mount, the stabilizing arms and the mounting latches will pass through the girder web holes to engage the support member holes and the strike barbs respectively.

7. The wiring block mount as recited in claim 6, for use in connection with a second conductor termination array having a predetermined length, wherein:

the attachment means firther comprises a second wiring block secured to the wiring block mount alongside the first wiring block, the second wiring block having third and fourth stabilizing arms and third and fourth mounting latches projecting outward from the second wiring block, the second termination array being secured to the second wiring block; and the wiring block mount further comprises third and fourth support members, each having a hole there through, and third and fourth strike plates having third and fourth strike barbs respectively, so that upon securing the second wiring block to the wiring block mount, the third and fourth stabilizing arms will slidingly engage the third and fourth support member holes respectively, so as to stabilize the second wiring block, and the third and fourth mounting latches will engage the third and fourth strike barbs respectively, so as to releasably retain the second wiring block on the wiring block mount.

8. The wiring block mount as recited in claim 7, for use in connection with a third and a fourth conductor termination array, each array having a predetermined length, wherein:

the attachment means further comprises third and fourth wiring blocks secured to the wiring block mount above the first and second wiring blocks, the third wiring block having fifth and sixth stabilizing arms and fifth and sixth mounting latches projecting outward from the third wiring block, the fourth wiring block having seventh and eighth stabilizing arms and seventh and eighth mounting latches projecting outward from the fourth wiring block, the third and fourth termination arrays being secured to the third and fourth wiring blocks, respectively; and the wiring block mount further comprises fifth, sixth, seventh, and eighth support members, each having a hole there through, and fifth, sixth, seventh, and eighth strike plates having fifth, sixth, seventh, and eighth strike barbs respectively, so that upon securing the third and fourth wiring blocks to the wiring block mount, the fifth, sixth, seventh, and eighth stabilizing arms will slidingly engage the fifth, sixth, seventh, and eighth support member holes respectively, so as to stabilize the third and fourth wiring blocks, and the fifth, sixth, seventh, and eighth mounting latches will engage the fifth, sixth, seventh, and eighth strike barbs respectively, so as to releasably retain the third and fourth wiring blocks on the wiring block mount.

9. The wiring block mount as recited in claim 5, wherein the attachment means comprises:

a standoff element extending from an inner edge integral with the front of the girder to an outer edge generally parallel to the girder, and extending between the girder first and second ends;

a plurality of securing barbs spaced apart along the length of the termination array; and a plurality of recesses spaced apart along the standoff element second edge for receiving the barbs, the recesses having shoulders for releasably retaining the securing barbs.

10. The wiring block mount as recited in claim 9, wherein the outer edge of the standoff element extends beyond the girder first and second ends.

11. A method of mounting a conductor termination array having a predetermined length on a terminal frame having first and second parallel columns spaced apart a predetermined distance, each column having a plurality of vertically in-line mounting holes spaced uniformly apart, the method comprising the steps of:

extending a girder between opposite first and second ends to form a wiring block mount;

aligning a mounting hole at the girder first end with one of the first column mounting holes;

aligning a mounting hole at the girder second end with one of ht second column mounting holes;

mounting the girder to the terminal frame;

securing the termination array to the wiring block;

providing the wiring block mount with a support member having a hole there through;

sliding a wiring block stabilizing arm into engagement with the support member hole so as to stabilize the wiring block;

providing the wiring block with a strike plate having a strike barb; and engaging a wiring block mounting latch with the strike barb so as to releasably retain the wiring block on the wiring block mount.

12. The method as recited in claim 11, further comprising the steps of:

extending a standoff element from an inner edge integral with the girder to an outer edge generally parallel to the girder; and securing the termination array to the standoff element outer edge.

13. The method as recited in claim 12, further comprising the steps of:

providing a plurality of securing elements spaced apart along the length of the termination array;

providing a plurality of recesses spaced apart along the standoff element outer edge; and retaining the securing elements releasably in the recesses.

\* \* \* \* \*